July 19, 1960 J. V. NIIRANEN ET AL 2,945,304

PERIOSOMATIC TRAINING DEVICES

Filed April 29, 1959 8 Sheets-Sheet 1

INVENTOR.
JOHN V. NIIRANEN
ROBERT B. WELDEN

BY

Laurence S. Epstein
ATTORNEYS

July 19, 1960 J. V. NIIRANEN ET AL 2,945,304

PERIOSOMATIC TRAINING DEVICES

Filed April 29, 1959

8 Sheets-Sheet 2

INVENTOR.
JOHN V. NIIRANEN
ROBERT B. WELDEN
BY
Laurence S. Epstein
ATTORNEYS

INVENTOR.
JOHN V. NIIRANEN
ROBERT B. WELDEN
BY
Laurence S. Epstein
ATTORNEYS

INVENTOR.
JOHN V. NIIRANEN
ROBERT B. WELDEN
BY
Laurence S. Epstein
ATTORNEYS

July 19, 1960 J. V. NIIRANEN ET AL 2,945,304

PERIOSOMATIC TRAINING DEVICES

Filed April 29, 1959 8 Sheets-Sheet 5

INVENTOR.
JOHN V. NIIRANEN
ROBERT B. WELDEN

BY Laurence S. Epstein
ATTORNEYS

INVENTOR.
JOHN V. NIIRANEN
ROBERT B. WELDEN
BY
Laurence S. Epstein
ATTORNEYS

INVENTOR.
JOHN V. NIIRANEN
ROBERT B. WELDEN

BY Laurence S. Epstein
ATTORNEYS

INVENTOR.
JOHN V. NIIRANEN
ROBERT B. WELDEN
BY
Laurence S. Epstein
ATTORNEYS

United States Patent Office 2,945,304

Patented July 19, 1960

2,945,304

PERIOSOMATIC TRAINING DEVICES

John V. Niiranen, Bethesda, Md., and Robert B. Welden, Greenport, N.Y., assignors to the United States of America as represented by the Secretary of the Navy Filed Apr. 29, 1959, Ser. No. 809,889

3 Claims. (Cl. 35—17)

Figure 1:
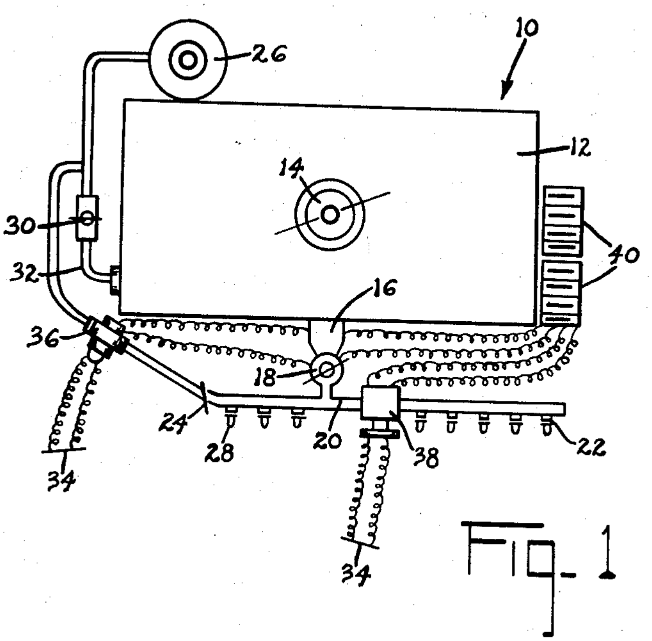

(Granted under Title 35, U.S. Code (1952), sec. 266)

The invention described herein may be manufactured and used by or for the Government of the United States of America for governmental purposes without the payment of any royalties thereon or therefor.

This invention relates to a training means for simulating early emergency casualty care and particularly to moulages which are fitted around the "patient" to provide realistic simulation of wounds.

The existing methods for teaching early emergency casualty care, or first aid, are unsatisfactory in the realism obtained by the simulation. One system provides a tag describing the pretended type of wound. This tag is placed on a volunteer and the correct first aid is administered to him. The realism obtained by this method is minimal. In an improved method, a simulated wound actually was painted on the volunteer. While this was satisfactory, insofar as realism obtained was concerned, the simulation was inadequate. Later improvements provided rubber moulages painted with wounds. This was attached to the proper anatomical portion of the "injured" and was readily removed. But with no flow of blood through open wounds, complete realism was not obtained and it was found desirable to improve on such devices.

As a result, a simulacrum containing an artificial body member, having simulated layers of skin and blood vessels, was constructed in combination with a simulated blood supply reservoir. Simulated blood was pumped through the blood vessels and wound closure and blood vessel clamping techniques were taught. This structure and method has been described and claimed in the application of John V. Niiranen and Paul H. Tanner, Serial No. 588,584 filed May 31, 1956 and now Patent No. 2,871,579. This technique has been carried forward and improved by the instant invention wherein moulages of various parts of the body are provided and are adapted to be fitted tightly around that particular portion of the anatomy to be treated. The simulated blood travels through plastic tubes and out through cut blood vessels and open wounds in realistic simulation of actual injury. In this manner, practice in first aid is provided under conditions as close to actual injuries as is possible.

An object of the invention is to provide realistic simulation of injury whereby training in first aid is provided under conditions closely analogous to actual injury.

Another object is to provide a moulage that will fit snugly around the portion of the anatomy where injury is simulated so that first aid may be practiced at the particular point of injury.

Another object is to provide a moulage having means through which simulated blood flows in close approximation of real blood escaping from the anatomy of a person who has been badly injured.

Still another object is to provide a storage means and connecting system with a moulage to supply the latter with a reservoir of simulated blood that can be controlled to simulate arterial or venous flow. In addition, a controlled air supply is used in conjunction with a venous flow to create a sucking chest wound.

It is yet another object to simulate a closed airway where emergency methods of managing such closed airway may be practiced in a manner identical to emergency measures in case of actual injury.

Figure 4:
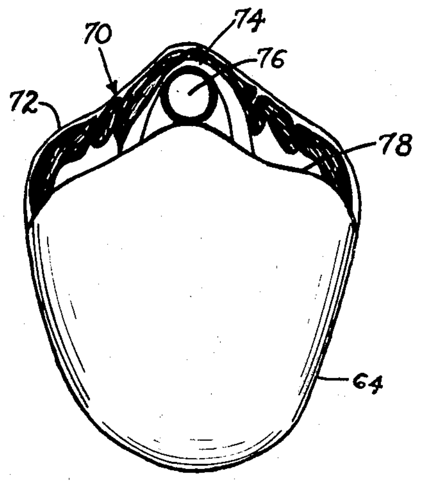
Figure 2:
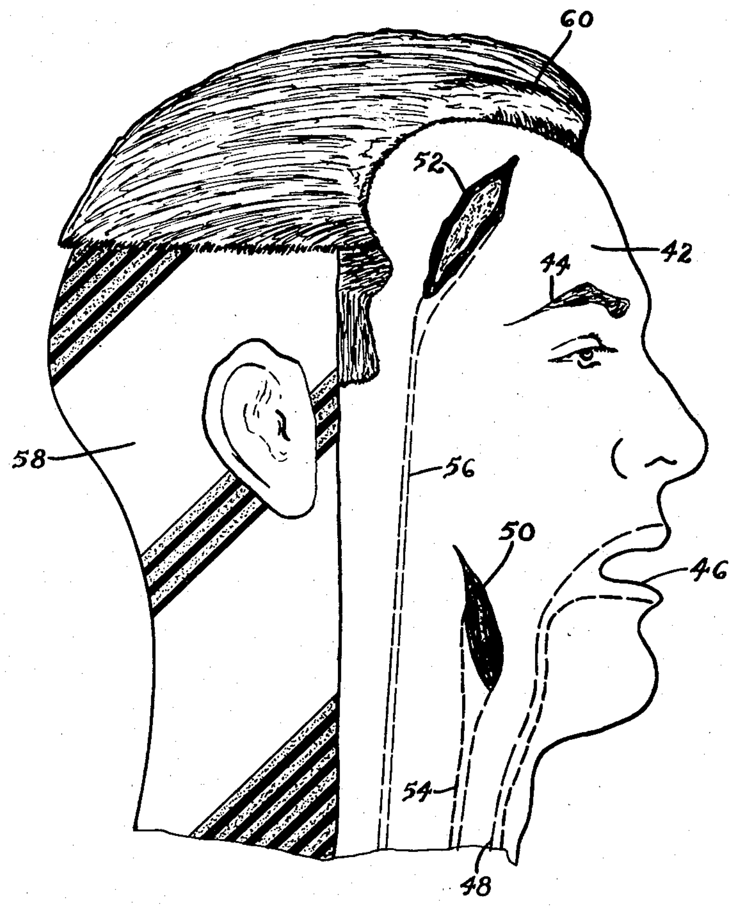
Figure 3:
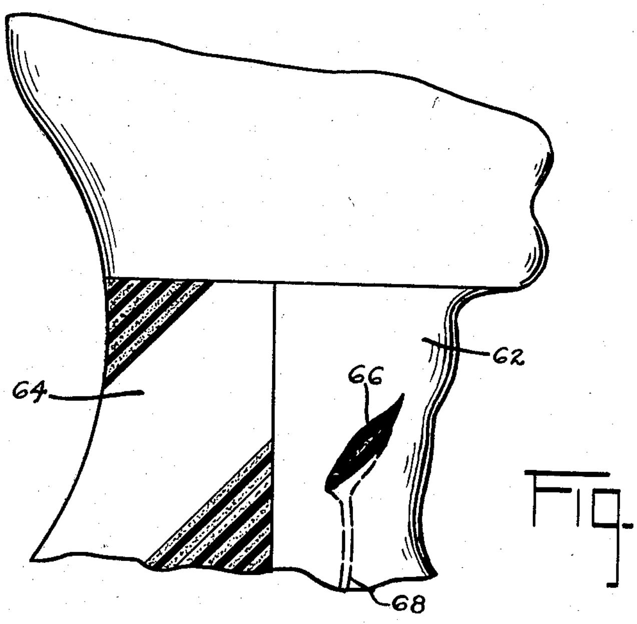
Figure 10:
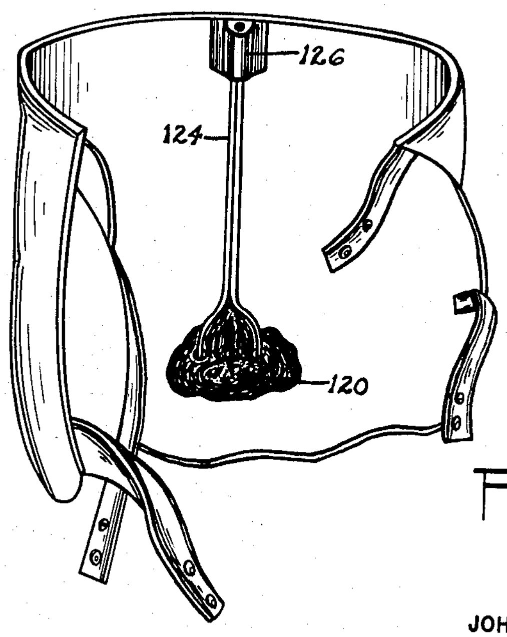
Figure 5:
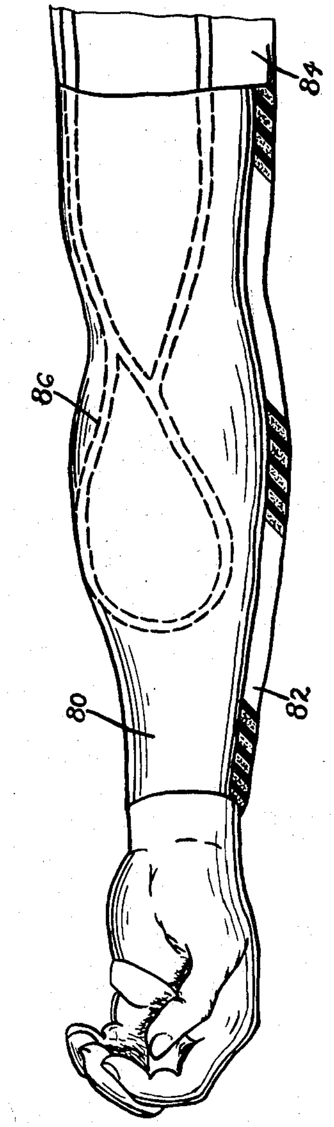
Figure 6:
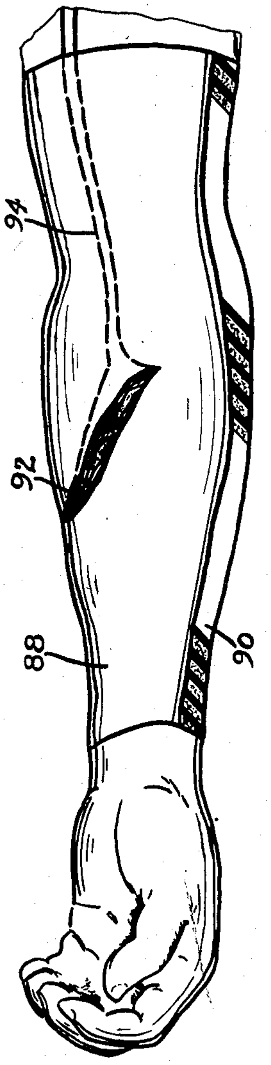
Figure 7:
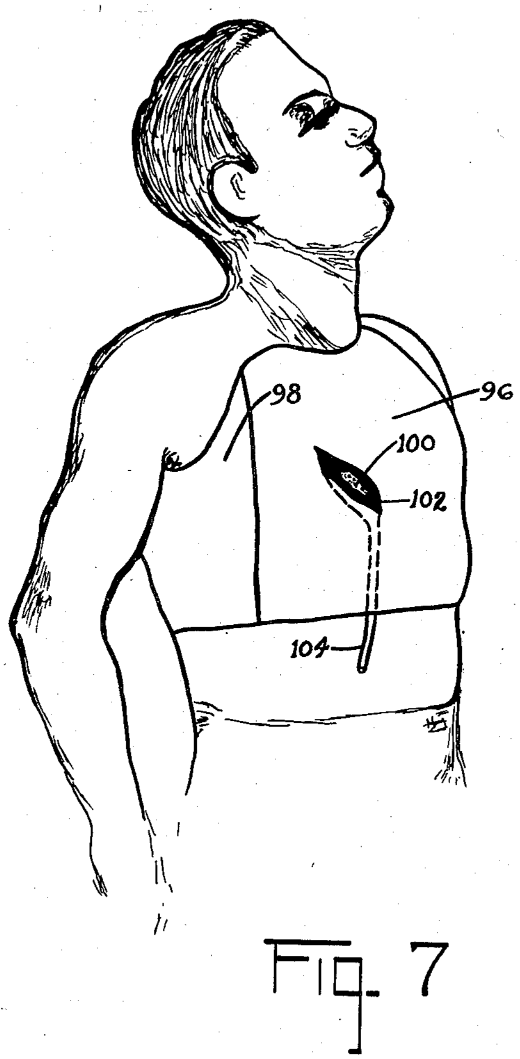
Figure 8:
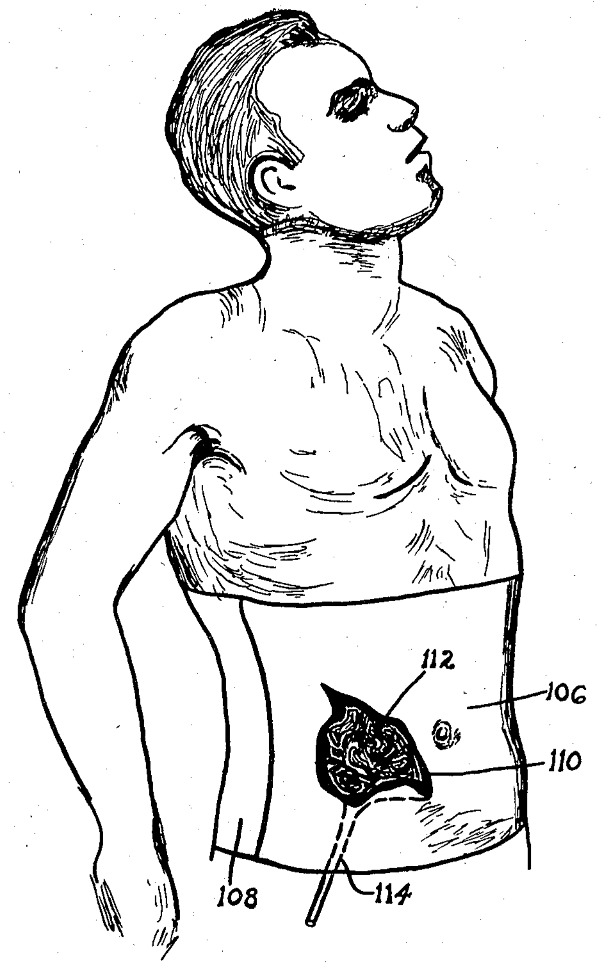
Figure 9:
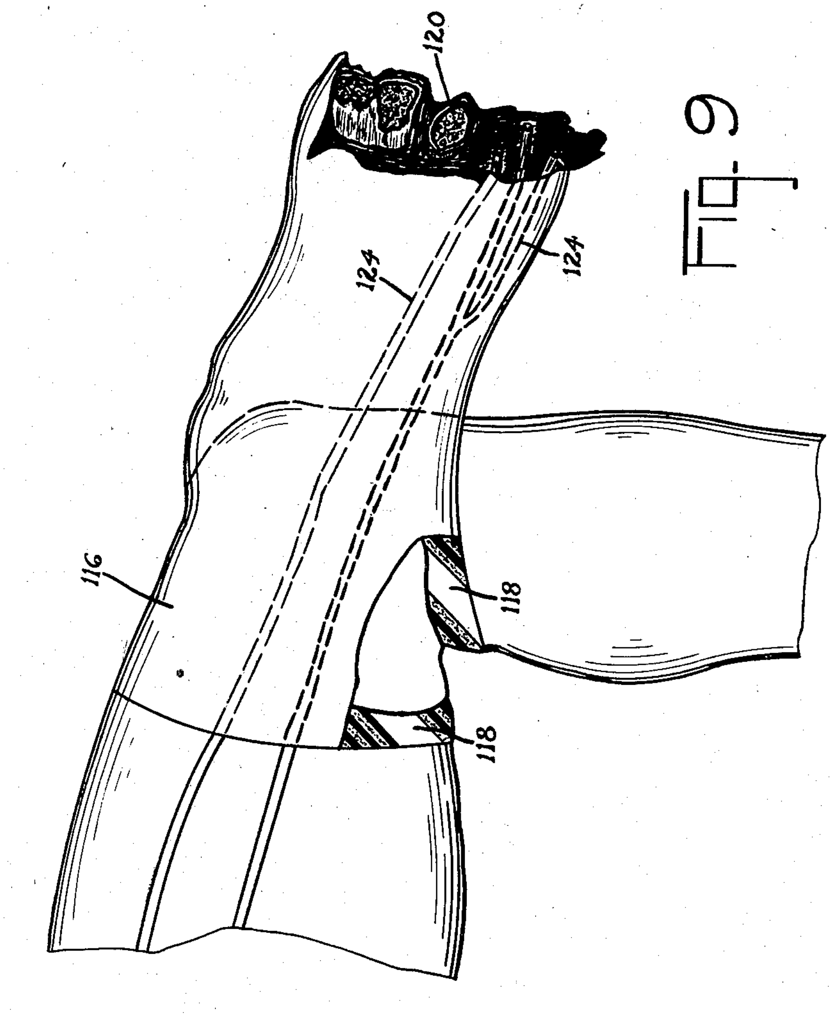
Figure 11:
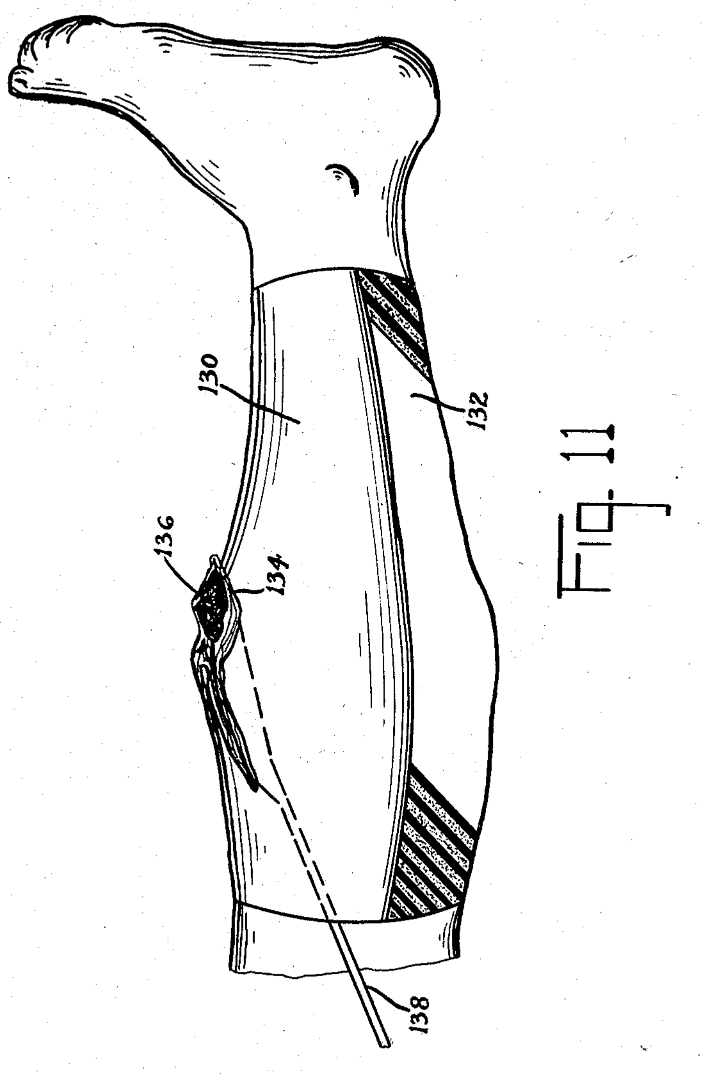

Other objects and many of the attendant advantages of this invention will be readily appreciated as the same becomes better understood by reference to the following detailed description when considered in connection with the accompanying drawings wherein:

Figure 1 is a schematic illustration, in plan, of a storage tank and actuating mechanism for simulated blood supply, Figure 2 is a side view of a face moulage illustrating face and head wounds, Figure 3 is a side view of a neck moulage, Figure 4 is a front view of a neck moulage illustrating closed airways, Figure 5 is a facsimile arm with the major venous system illustrated for demonstrating venipuncture, Figure 6 is a facsimile arm to illustrate massive arterial flow through a wound, Figure 7 illustrates a "sucking" chest-wound, Figure 8 illustrates an abdominal wound with protruding viscera and hemorrhage, Figure 9 is an illustrated facsimile leg showing a traumatic amputation, and, Figure 10 is a rear view of a moulage and depicts the capillary blood supply tubes, and Figure 11 illustrates an open leg fracture moulage.

The inventive concept is illustrated through the various figures as moulages adapted to meet most variable conditions, including field conditions. Each moulage presents a different problem in casualty treatment. Representative examples will be described and they include management of a closed airway and casualty treatment of head wounds, chest wounds, abdominal wounds, open and closed fractures, arterial and venous bleeding, and burns. These moulages are adapted to be fitted on a volunteer in a tightly strapped relation. The vinyl resin moulage represents a casualty problem and is particularly helpful in that it responses a casualty treatment which is provided. The moulages which will be shortly described in detail, are connected by rubber tubing to a central fluid supply 10. The fluid supply system contains a fluid storage tank 12 which is adapted to store venous and arterial blood flow. The fluid composition is made of glycerin, water and vegetable coloring and is stored in a tank, which is preferably non-corrosive, until ready for use. A fresh supply of simulated blood is provided through the inlet opening 14. Simulated blood is withdrawn through the outlet 16 and is controlled by the shut-off valve 18. A manifold conduit 20 is attached to the supply tank and is provided with a plurality of outlets 22 through which the simulated arterial flow passes to the moulage. An outlet in the manifold at 24 permits the venous flow, which may be created by a centrifugal pump controlling an automobile fuel pump that is activated by a cam attached to a low r.p.m. motor. In addition, a gate valve 24 controls the flow of air or $CO_2$, provided through a suitable storage unit 26 to the outlet valve 28. This is utilized when a sucking chest wound effect is to be created in conjunction with a venous flow. To prevent the building up of pressure during treatment of bleeding wounds on the moulage on the volunteer, a pressure relief valve 30 is provided in the conduit 42 leading from the supply tank. The manual switches 34 are provided to actuate the solenoids 36 and 38 respectively. Where a source of electric current is not available, the batteries 40 may be utilized to provide the necessary electric current. Any number of moulages can be used at the same time and the supply tank together with the remaining equipment may be compactly stored. The simulated blood supply unit has been more fully described in the co-pending application, Serial No. 588,584 and will not be further described here. It should be noted that $CO_2$ supply and a solenoid have been substituted for the air compressor and the on-off valve of the above-mentioned application in order to make the pressure producing means portable.

Referring to Figures 2 through 11, a number of moulages adapted to represent different wounds usually utilized in training personnel for emergency first aid treatment, have been illustrated. While these represent the most common type of wounds, it is to be understood that other moulages depicting less usual types of injuries, such as burns, atomic explosion injuries, may be provided within the spirit of the invention. Figure 2 discloses a face moulage which contains head injuries and a face wound. The face moulage 42 is constructed of vinyl plastic, formed against a metal mold, and is colored in a manner similar to that of the average skin. Color variations, such as eyebrows 44 or skin blemishes, are incorporated in the plastic material during the processing. This method assures that the moulage training device will retain its color for a long period of time under normal usage. A plurality of training problems have been incorporated in the face section 42 illustrated. Hemorrhage from the oral cavity or mouth 46, is provided with simulated blood from the supply tank 12 through the blood supply tube 48 when the central automatic fluid supply is adjusted to simulate either an arterial or venous blood flow, as the case may be. The simulated blood travels through the manifold 20 to the proper outlet and into the blood supply tubes 48 for emission to the oral cavity 46. With the blood flowing, the trainee is then instructed and proceeds to stop the hemorrhage. Thus, a realistic training is provided and one which will yield proficiency under actual conditions. A large face wound 50 is also provided in the face moulage 42 on the cheek, and a head wound 52 is also provided. Similarly, the blood supply tubes 54 and 56 carry the flow of blood from the supply tank 12 to the respective wounds. The trainee here also goes through the actual steps of stopping the flow of blood. The posterior part of the face 42 contains an elastic back member 58 which fits tightly over the back of the head and permits the face portion 42 to conform closely to the face of the volunteer. Breathing is accomplished through suitable holes cut into the nose of the face mask. In addition, a plastic wig 60, which covers the margins of the volunteer's hair is utilized to more closely achieve realism. It should be noted that the blood supply tubes 48, 54 and 56 are also located in the proper anatomic positions so that the pressure points can also be demonstrated to the trainee.

Similarly a neck moulage 62 is provided and also contains the elastic back 64 that will ensure a close fitting moulage. A neck wound 66 is provided in the moulage with a suitably connected blood supply tube 68 connecting to the exterior of the moulage and to the source of supply. Blood may thus be caused to flow and the first aid student then follows the procedure necessary for stopping hemorrhage. The neck moulage illustrated in Figure 3 is shown schematically, while the front view of Figure 4 discloses the actual construction so that emergency opening of a closed trachea can be illustrated. The elastic back 64 holds the moulage in position underneath the chin of the volunteer patient and the anterior portion 70 is made in a number of layers comprising a vinyl resin skin 72, the thyroid cartilage 74 and the trachea 76, as well as a protective plastic base of fiberglass and plastic 78. The latter forms a protective plastic base to protect the volunteer during the demonstration of a cricothyroidotomy. The trachea and thyroid are made preferably of a polyethylene material. The polyethylene trachea tube is adapted to be repositioned so that a new incision can be repeated many times before the tube 76 must be replaced. By means of this neck moulage emergency means to open a closed trachea may be illustrated and practiced. Possibility of injury to the volunteer is prevented by means of the fiberglass base.

Where it is desired, a moulage is provided to train in the withdrawal of intravenous fluids or for injections into a vein. As is clearly illustrated in Figure 5, the moulage 80 is constructed in a sleeve-like manner and contains the elastic portion 82 which functions to have the moulage conform to the shape of the arm 84. The moulage 80 is of vinyl resin material and also contains the protective layer of fiberglass and plastic underneath it in position against the skin of the volunteer injured person. For clarity of description, this has been eliminated from the figure, but it is to be understood that it operates in the same manner as that described with relation to Figure 4. The simulated veins 86 are also made of latex tubing and are affixed to the underside of the moulage 80 in the same position as the major venous system of the average arm. The latex tubing is connected to the central fluid supply for the purpose of either administering or withdrawing fluids.

Figure 6 is generally similar to that of Figure 5, but illustrates a large open wound of the forearm. The vinyl moulage 88 is contoured to the forearm through the elastic 90 and is provided with the large open wound 92 to represent massive arterial flow caused by severed arteries. The blood supply tube 94 is connected to the wound 92 and the supply tank 12. In this type of problem, the pulsating flow of arterial blood is simulated through the control means of the supply system and the first aid student acts to stop the blood flow in the manner conventionally carried out.

The inventive concept can also be applied to body wounds such as those of the chest and of the abdomen. As is illustrated in Figure 7, a moulage 96 of vinyl is provided across the chest of the volunteer injured person and is retained in close conformity to the actual shape of the chest by means of the elastic back 98. The figure illustrates a small penetrating type of wound commonly called a sucking chest wound. In wounds of this type, a frothing type of bleeding takes place. In order to achieve this simulation of bleeding, the wound 100 is generally small and is provided with a reservoir portion 102 below the surface thereof and connected thereto. This reservoir connects with the plastic tube 104 to the source of simulated blood supply. When the blood is pumped through the tube 104 into the reservoir 102, a frothing effect is obtained as this simulated blood emerges through the wound portion 100, to provide a realistic appearance of bleeding. The student trainee may then apply the desired first aid technique to stop such bleeding. Obviously, other types of chest wounds may be shown, such as the large open type having a wire area of trauma. In Figure 8 the moulage is applied to the abdomen of the victim and comprises the moulage 106 retained around the body by the elastic portion 108. The large wound 110 is of such size that the internal viscera 112 protrudes through the opening and a hemorrhaging effect is obtained through the connecting tube 114 with the source of simulated blood supply. The student trainee then is taught how to replace the internal organs and to stop the bleeding exactly as he would do in the event he was required to treat an actual wound of this nature. The viscera 112 may be constructed of the same material as the moulage itself, but it's more spongy and pliable in nature.

The moulage of the invention may be applied equally as well to the lower extremities of the human body and Figures 9 through 11 exemplify such use. Figures 9 and 10 simulate a traumatically severed limb and the moulage 116 is of a generally elongated construction and is provided with the elastic straps 118 for attachment to the knee of the supposedly injured volunteer. The knee is preferably bent so that the extended free portion of the moulage 116 can be utilized to demonstrate the control of hemorrhage either with hemostat or with tourniquet. Realism is provided through the utilization of a plastic bone 120 extending from the supposedly severed edge of the limb and a plurality of blood supply tubes 124 depict the major blood vessels to be found in the leg. In operation the supply tube of simulated blood is connected through the adaptor 126 (Figure 10) to the blood supply 24 to provide realistic bleeding. The proper treatment is then applied to the hemorrhaging leg. In Figure 11 an injury less severe than the injury of Figure 9 is illustrated wherein the vinyl moulage 130 is placed about the angle and the lower portion of the foot and is retained in position by means of the elastic 132. An open fracture 134 is provided in the moulage and the skin portion of first aid training for this purpose is applied. An area of trauma is also included and contains the protruding end of the tibia 136. The tibia is made of a hard plastic to simulate bone. The simulated blood supply fluid passes through the blood supply tube 138 so that pressure bandages, tourniquets, and pressure points can be demonstrated to the first aid trainee and be realistically treated by him.

Many other types of wounds or conditions requiring first aid treatment can be utilized in carrying out the invention. For example, a moulage depicting second and third degree burns may be utilized, other moulages depicting the problem of venous flow, or closed fractures and minor burns may also be added to the training program. The moulages themselves consist of a fairly heavy vinyl resinous material and are molded on a metal mold to provide the necessary ridges and depressions required to assume the shape of the open wound which represents a particular casualty. The wound area itself is suitably colored to indicate injured tissue and bone and is provided with the necessary number of small openings or holes adapted to receive the ends of the plastic blood supply tubes. These blood supply tubes are of capillary diameter and connect together generally at the portion of the moulage closest to the source of simulated blood supply. A connector conduit or tubing, as is depicted at 126 in Figure 10, is attached, as by heat treatment or other suitable means, to the vinyl moulage at the point where the blood supply tubes connect. This connector means receives the free end of the blood supply conduit and thereby provides a continuous, though removable, source of blood supply. When the blood supply system is actuated, the bleeding, common in so many wounds, takes place and venous or arterial blood flow, depending on the wound being treated will travel through the blood supply mechanism. The capillary outlets of the blood supply tubes allows the simulated blood to pass through the wound in a realistic manner. In the same way, the frothing effect of a sucking type of wound is controlled to the blood supply system by the addition of air or carbon dioxide to the venous blood supply. A rheostat is utilized with the blood supply system to change the number of revolutions per minute for the centrifugal pump in order to create a slow or fast pulse, as is needed for demonstration of different problems. The moulages are capable of continued re-use for long periods of time. The close simulation of the actual color of the skin of a casualty adds to the realism of the training and further aids the first aid student in transferring his practice to the actual conditions, when necessary. While the entire description of the invention has been directed to the use of a live volunteer, it should be obvious that an inanimate manikin may be substituted without affecting the training provided by the invention. The realism of this training is especially effective because of the closely simulated physiological reactions that are expected with the various types of injuries.

Obviously many modifications and variations of the present invention are possible in the light of the above teachings. It is therefore to be understood that within the scope of the appended claims the invention may be practiced otherwise than as specifically described.

We claim:

1. In a surgical simulacrum for teaching first aid, a flexible moulage constructed to conform to a portion of the body for which an injury is simulated, said moulage being in the shape of a human face and including a mouth, a plurality of apertures in said mouth, a capillary tube extending across said moulage and terminating in said mouth apertures, and a connector mounted on said moulage and housing a portion of said tube and adapted to connect a supply of simulated blood to said capillary tube whereby an oral hemorrhage may be simulated.

2. In a surgical simulacrum for teaching first aid, a neck moulage adapted to simulate a neck wound, a simulated trachea tube positioned within said moulage, and a fiberglass base in said moulage beneath said trachea tube to protect the student from injury, said trachea tube being adapted to have incisions made therein when practicing first aid, whereby a cricothyroidotomy is simulated.

3. In a surgical simulacrum for teaching first aid, a flexible moulage constructed to conform to a severed limb, said moulage having a plastic bone extending therefrom, a plurality of simulated blood supply tubes extending across said moulage and having open ends, and a connector on said moulage and adapted to connect a supply of simulated blood to said simulated blood tubes whereby a realistic simulation of a wound is obtained to provide first aid training.

References Cited in the file of this patent

UNITED STATES PATENTS

| | | |
|---|---|---|
| 2,324,702 | Hoffmann et al. | July 20, 1943 |
| 2,752,697 | Lawall | July 3, 1956 |
| 2,871,579 | Niiranen et al. | Feb. 3, 1959 |
| 2,871,584 | Poole | Feb. 3, 1959 |

FOREIGN PATENTS

| | | |
|---|---|---|
| 87,223 | Norway | Apr. 9, 1956 |
| 323,347 | Switzerland | Sept. 14, 1957 |